July 8, 1947.  R. N. MEYER  2,423,513
PROJECTION NAVIGATIONAL INSTRUMENT
Filed Sept. 18, 1945  3 Sheets-Sheet 1

INVENTOR.
Robert N. Meyer
BY

July 8, 1947.  R. N. MEYER  2,423,513
PROJECTION NAVIGATIONAL INSTRUMENT
Filed Sept. 18, 1945  3 Sheets-Sheet 2
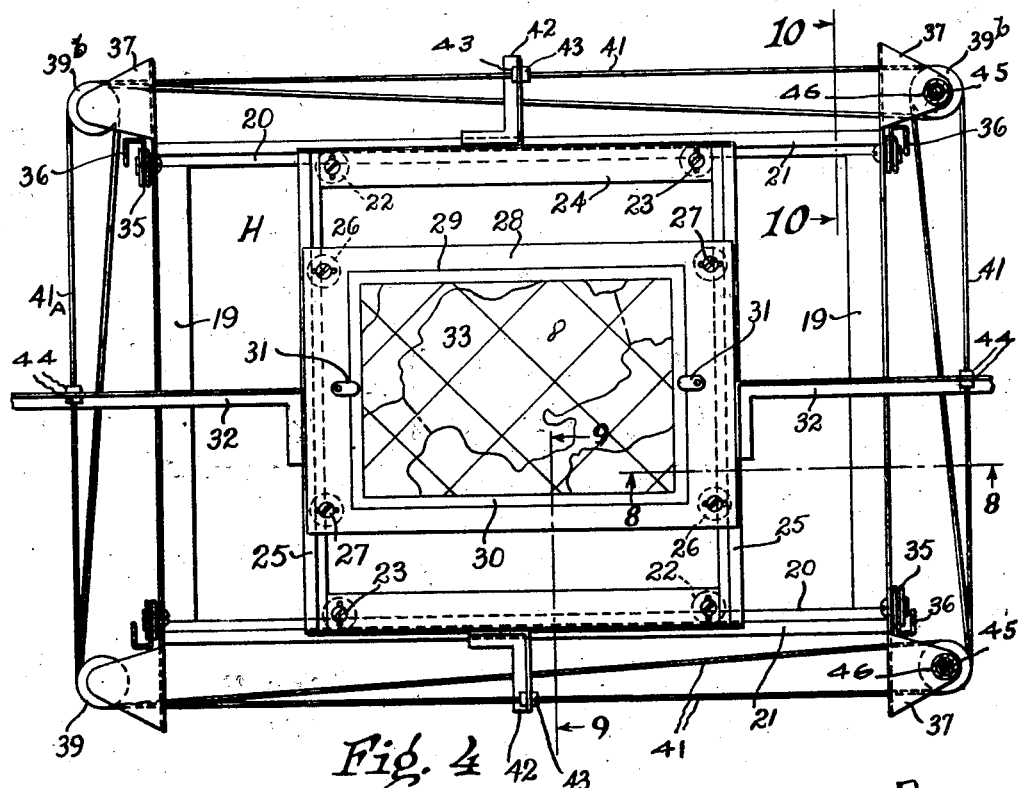
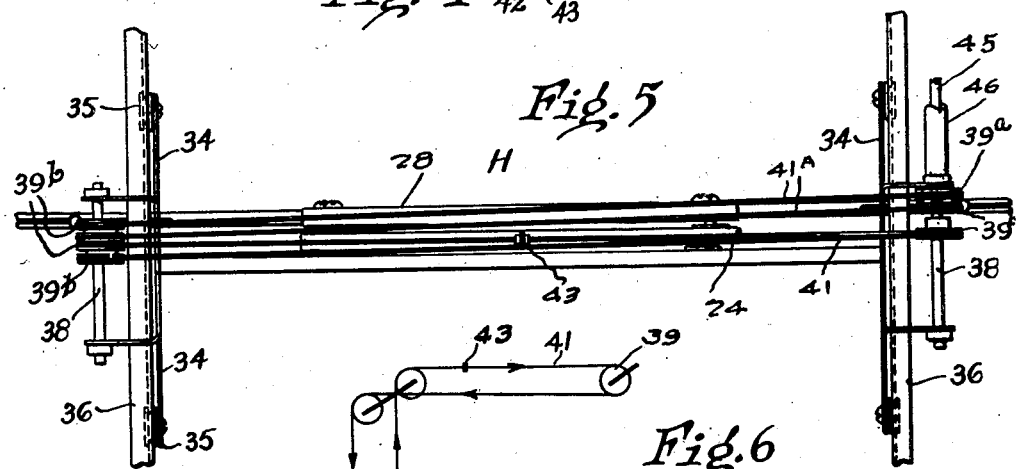
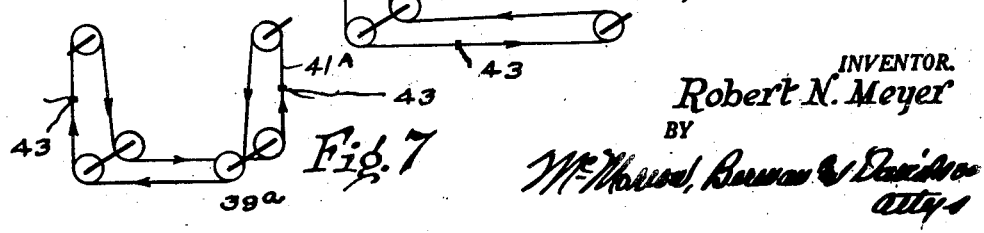
INVENTOR.
Robert N. Meyer

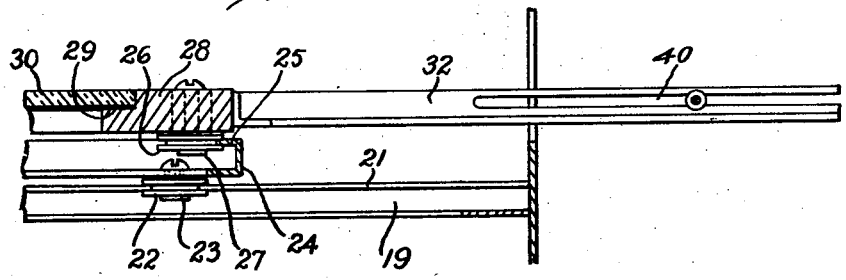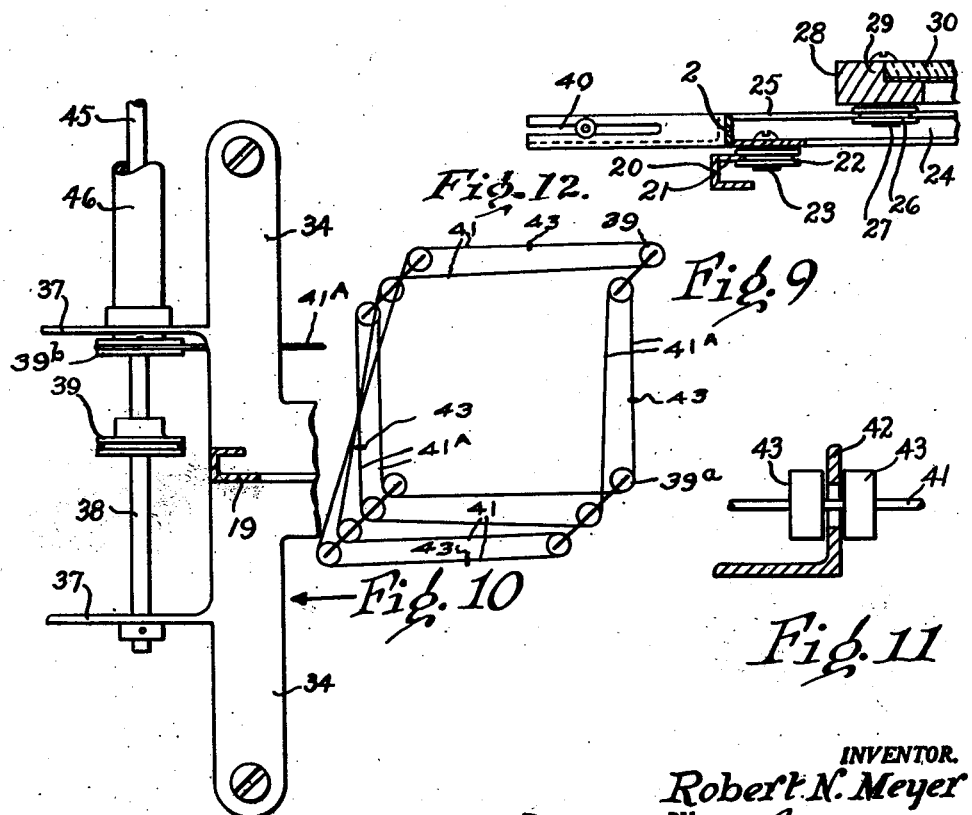

Patented July 8, 1947

2,423,513

UNITED STATES PATENT OFFICE 2,423,513

PROJECTION NAVIGATIONAL INSTRUMENT

Robert N. Meyer, Chicago, Ill.

Application September 18, 1945, Serial No. 616,979

3 Claims. (Cl. 88—24)

My present invention relates to navigational instruments in general, but is more particularly concerned with an instrument of this character which will enable pilots to view and scale any sectional or regional air map while flying and without the labor or unfolding and holding large maps in the confines of a pilot's cabin or cockpit.

The primary object of the invention is to provide a device which will obviate the use of regional maps, such as are usually supplied to pilots, and yet provide the same data in a manner to enable a pilot to readily view and scale it.

Another object of the invention is to provide an instrument of the character described which will enable the pilot to view any portion of an air map in the same scale as mapped or to view a larger portion of it on a reduced scale so that he can estimate distances and directions between points on the map which would not be readily done on a true scale.

A further object of the invention is to provide a device of the character described which will enable a pilot to make corrections for magnetic deviation and variation so that when a course is acertained the compass course may be read directly.

Still a further object of the invention is to provide construction which will enable a pilot to select his course and then to vizualize the starting point and at least a part of the course in the proper direction to the true scale so that he can readily advise himself of the position and drift of the plane.

With the foregoing and other objects and advantages in view, the invention consists of a novel construction, and arrangement of parts hereinafter described and claimed.

In the accompanying drawings illustrating the invention:

Figure 4 is a front elevation of the photographic slide and related mechanism.

Figure 5 is a bottom plan view thereof.

Figure 6 is a diagrammatic view illustrating the movement of the photographic slide laterally.

Figure 7 is a similar view illustrating the vertical movement thereof.

Figure 8 is a fragmentary horizontal section of the photographic slide on line 8—8 of Figure 4.

Figure 9 is a fragmentary vertical section of the slide on line 9—9 of Figure 4.

Figure 10 is a fragmentary vertical section on line 10—10 of Figure 4.

Figure 11 is a fragmentary transverse section belt, collars and angle iron.

Figure 12 is a composite diagrammatic view of both belts and correlated pulleys.

Like reference characters in the description and drawings designate like parts of construction.

Figure 1:
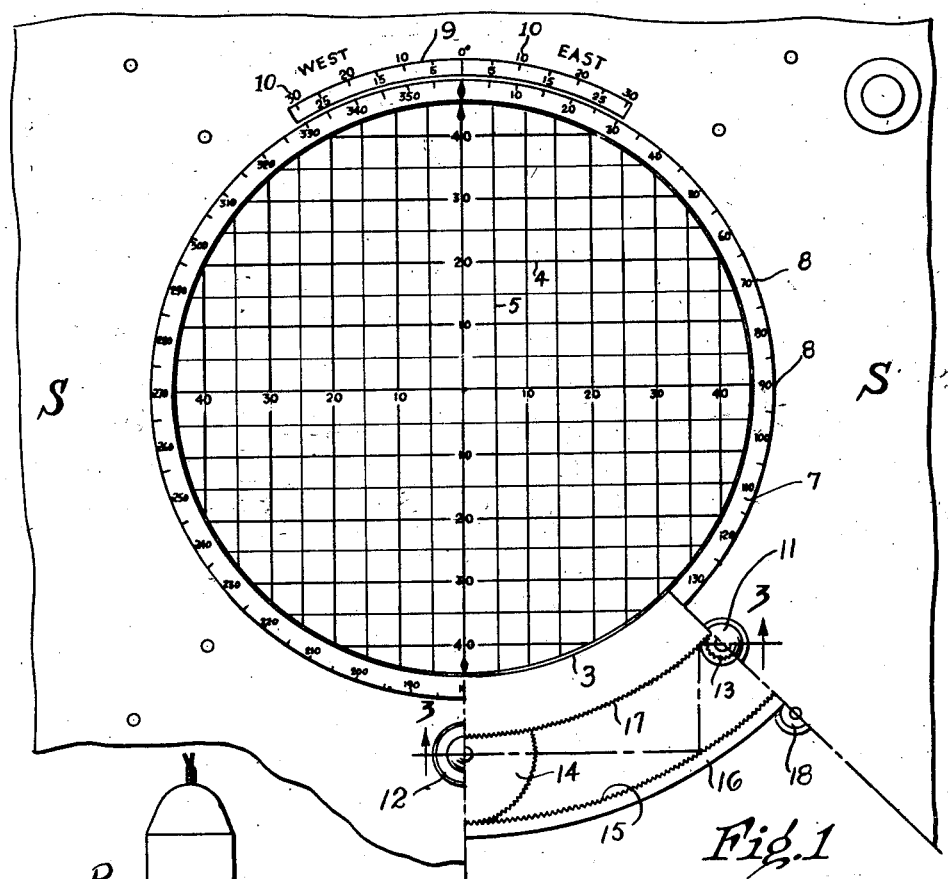
Figure 1 is a front elevation of the screen with a portion broken away to disclose rotating means for the grid and the arcuate calibrations for magnetic deviation and variation.
Figure 2:
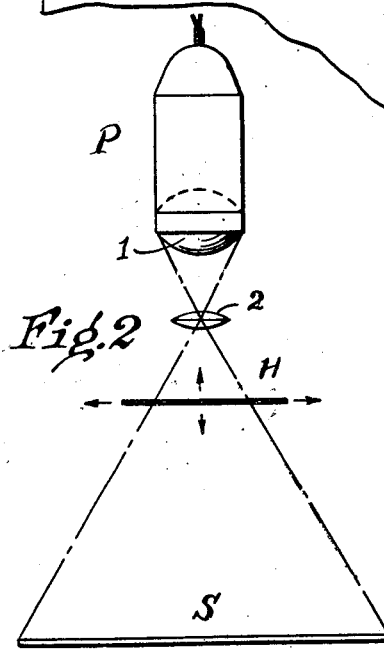
Figure 2 is a diagrammatic view of the arrangement of projector mechanism and screen.
Figure 3:
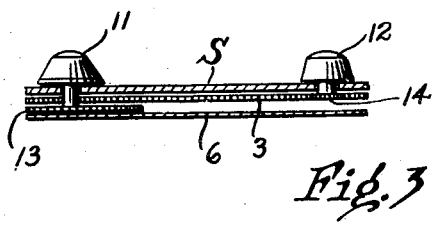
Figure 3 is a fragmentary horizontal transverse sectional view on line 3—3 of Figure 1.

In its simplest and barest essentials the invention consists of a projector, a photographic slide of an air map adjustable in three planes and a translucent viewing screen, adjustable in an arc of 90°.

The projector P, consisting of a light source, conventional lenses 1 and 2 and photographic slide holder H, are suitably encased, dimensioned and positioned for use in an airplane in conjunction with a translucent viewing screen S, which is suitably supported in view of the pilot of the plane, preferably on the instrument panel. 1 is the condensing lens and 2 the focusing lens.

The screen S is circular and provided with an underlying rotatable grid 3 composed of mutually perpendicular lines 4 and 5 representing latitude and longitude. The squares formed by the lines 5 and 6 may be further subdivided if desired. This grid is mounted on a central stud projecting inwardly from the back of a screen box 6 in which the grid and related true track annulus 7 are encased. The perimeter of annulus 7 is provided with calibrations 8 representing units of angle from zero to 360° in ten degree markings and five degree subdivisions. Above said annulus 7 is a concentric segment within which a deviation and variation calibrated arcuate scale 10 is arranged to be visible. The markings to indicate magnetic deviation and variation read east and west from zero which normally registers with zero on the true track annulus 7.

Both the grid 3 and scale 10 are constructed to be rotated to right or left by means of adjusting knobs 11 and 12 mounted on studs through the screen S and operating rotatable gear tooth pinions 13 and 14, respectively. Pinion 14 is adapted to mesh with gear teeth 15 on the inner periphery of an annulus 16, which is concentric with the grid 3, while the smaller pinion 13 meshes with gear teeth 17 on the periphery of the grid 3. The annulus 16 is rotatably supported on rollers 18 mounted in the screen box. This arrangement with regard to the screen is designed to permit the grid to be turned through an arc of 90° so as to show direction and distance on the superimposed screen when illuminated. By the arrangement and construction of the rotatable scaler annulus 16 magnetic deviation and variation can be corrected or allowed for so that when a course is lined up on the grid 4, the compass course can be read directly.

The slide holder H is attached to the projector P a suitable distance in advance of the focusing lens 2 and is centered on the beam from the projector and is adjustable longitudinally.

It comprises a rectangular frame 19 provided with upper and lower angle plates 20, the horizontal branches of which are formed with rectangular, projecting flanges 21 serving as horizontal tracks for the upper and lower flanged rollers 22 on the vertically adjustable studs 23 projecting from the rear of the upper and lower bars of a rectangular, laterally movable frame 24. The side bars of said frame are provided with flanges 25 serving as vertical tracks for the flanged rollers 26 mounted rotatably on horizontally adjustable studs 27 projecting from the rear face of a rectangular frame 28.

The said frame 28 is provided on its front face and along its inner edges with a rectangular seat or recess 29 for the reception of a photographic slide 30 which is held in place by the pivoted fingers 31. Extending laterally from each side of frame 28 are angle bars 32 which are slotted longitudinally and adapted to hold the said frame in place as well as facilitate both vertical and lateral adjustment. Beneath the transparent plate of slide 30 is mounted a photographic air map 33, in color, adapted to be projected on screen S by a beam of light from the projector P. Various photographic slides depicting different portions of a master air map will be provided on the plane for use of the pilot when it is desirable to examine different parts of an air map. A small rack of slides, for example, could be supplied to cover all of the United States that is mapped. This would obviate the use of bulky air maps now in common use and render the information more readily available to pilots.

The vertical side bars of the holder frame 19 are provided on their outer sides and at the corners of the frame with lateral arms 34 adapted to support outwardly projecting studs on which are rotatably mounted the flanged rollers 35. These rollers are adapted to travel on longitudinally disposed tracks formed by vertical flanges on the horizontal angular bars 36 which are provided for the attachment of the frame 19 to the projector housing. The lateral arms 34 are provided on their upper edges with the upwardly and outwardly projecting, parallel, rectangularly disposed ears 37, in which are mounted spindles 38.

The two spindles on the right hand side of frame 19 are rotatable. They have extensions 45 which project through sleeves 46 attached to ears 37 and are manipulated by knobs. On each of the said spindles is a drive pulley adapted to be rotated thereby. On the upper right hand spindle 38 is drive pulley 39 and an idler pulley. On the lower right hand spindle 38 is drive pulley 39a and two idler pulleys. On the upper left hand spindle 38 are three idler pulleys and on the lower left hand spindle 38 four idlers. All idlers are referred to as 39b. The endless belt 41 is looped around driver 39 and the two stretches of the doubled belt are passed to the left of frame 19 to two idlers over which said stretches are looped, one idler for each stretch. Thence the two stretches are passed down the left hand side of said frame, and looped around two idlers on spindle 38 on the lower left hand side of the said frame. Thence the doubled belt passes beneath frame 24, horizontally, to an idler on the lower right hand spindle 38 where it is looped on said idler.

The belt 41 is connected to the top and bottom bars of frame 24 by means of angle bars or plates 42 provided in their vertically disposed branches with slots through which passes one stretch of the belt as will be seen by referring to Figure 11. The stretch of belt which passes through said slot is provided with stop collars 43, one on each side of the slot, which are adapted to move said angle bars and attached frame laterally to right or left as the belt moves. For the purpose of adjusting frame 24 the movement of belt 41 is limited, by the width of frame 19, to a short distance in each direction and is never circuitous. By the placement of the stop collars 43 on an upper and lower horizontal stretch of belt 41 and in vertical alignment, as shown in Figures 4 and 6, movement thereof in the same direction is attained, thus effecting any desired lateral adjustment of frame 24.

Frame 28 is adjusted independently of frame 24 by means of the separate endless belt 41A and correlated pulleys which will now be described. This belt is looped around the idler on the upper right hand spindle 38 and doubled downward on the right hand side of frame 19 to the spindle 38 at the lower right hand corner where one stretch of the belt is looped around the drive pulley 39a and the other around an idler. Thence the two stretches pass beneath frame 24 to the spindle at the lower left hand corner and around two idlers, from which they pass upward on the left hand side of frame 19 to an idler on the spindle located at the upper left hand corner thereof. Here the belt 41A is looped over said idler, thus completing the circuit. One stretch of this belt on each vertical side of frame 19 passes through the horizontally disposed slots 40 in branches or arms of angle bars 32 and attached thereto are stop collars 44 which are adapted to move the slide frame 28 up or down according to the direction of movement of said belt 41A. Like belt 41, it is moved as may be required for vertical adjustment of frame 28 up or down and for a limited distance in each direction, never in a complete circuit. The arrangement of stop collars being similar to that for belt 41 the said stop collars will move in the same direction relatively, thus effecting vertical adjustment of map frame 28. It will be obvious that a minute adjustment of the map frame vertically and/or laterally can be effected readily by the foregoing arrangement of belts and correlated pulleys, while adjustment thereof back or forth in front of the projector lens can be effected by moving the frame 19 in either direction, on the rollers 35.

Having thus described my invention, what I claim as new and desire to secure by Letters Patent, is:

1. In combination, a projector provided with a source of light, a screen arranged in alignment with said projector and spaced from the latter, and a photographic slide holder interposed between said projector and screen in alignment with the light beam from the projector, said screen including a circular grid, a calibrated true track annulus, a calibrated magnetic deviation and variation arcuate scale arranged concentrically with said grid and true track annulus, and means for rotatably adjusting said grid and said magnetic deviation and variation scale in relation to said track annulus consisting of gear teeth on the periphery of the grid, a gear tooth pinion meshing with the teeth on said grid and adapted to be manipulated by a knob on the face of the instrument panel, an interiorly gear tooth rotatable annulus adapted to rotate said arcuate magnetic deviation and variation scale in relation to said true track annulus, a gear tooth pinion meshing with the interior gear of said annulus which rotates the arcuate scale, and a knob of the face of the instrument panel adapted to rotate the last mentioned pinion.

2. In combination, a projector provided with a source of light, a screen provided with a circular grid, a calibrated true track annulus and an adjustable calibrated magnetic deviation and variation arcuate scale arranged concentrically with said grid and true track annulus, a longitudinally adjustable photographic slide holder interposed between said projector and screen in alignment with the light beam from the projector, means for adjusting the photographic slide holder laterally and/or vertically, and means for rotatably adjusting said grid and said magnetic deviation and variation scale in relation to said true track annulus consisting of gear teeth on the periphery of the grid, a gear toothed pinion meshing with the teeth on said grid and adapted to be manipulated by a knob on the face of the instrument panel, an interiorly gear toothed rotatable annulus adapted to rotate said arcuate magnetic deviation and variation scale in relation to said true track annulus, a gear toothed pinion meshing with the interior gear of said annulus which rotates the arcuate scale, and a knob on the face of the instrument panel adapted to rotate the last-mentioned pinion.

3. In combination, a projector provided with a source of light, a screen provided with a circular grid, a calibrated true track annulus and an adjustable calibrated magnetic deviation and variation arcuate scale arranged concentrically with said grid and true track annulus, a longitudinally adjustable photographic slide holder interposed between said projector and screen in alignment with the light beam from the projector, means for adjusting the photographic slide holder laterally and/or vertically, said means for adjusting the photographed slide holder consisting of a plurality of pulleys attached to the supports for said holder, movable endless belts adapted to travel on said pulleys and attached to a laterally movable member of said holder and also to a vertically movable member adapted to contain the photographic element to be reproduced on said screen, and means for moving said belts in either direction of travel.

ROBERT N. MEYER.

REFERENCES CITED

The following references are of record in the file of this patent:

UNITED STATES PATENTS

| Number | Name | Date |
| --- | --- | --- |
| 2,314,497 | Hargrave et al. | Mar. 23, 1943 |
| 2,267,649 | Graves | Dec. 23, 1941 |
| 2,296,928 | Briechle et al. | Sept. 29, 1942 |
| 2,271,296 | Hargrave et al. | Jan. 27, 1942 |
| 2,260,551 | Boni et al. | Oct. 28, 1941 |
| 1,228,685 | Magowan | June 5, 1917 |

FOREIGN PATENTS

| Number | Country | Date |
| --- | --- | --- |
| 324,395 | Great Britain | Jan. 27, 1930 |